2,705,225

COMPOSITIONS COMPRISING ACRYLONITRILE POLYMERS

Ernest Jan Kowolik and James Wotherspoon Fisher, Spondon, near Derby, England, assignors to British Celanese Limited, a British company No Drawing. Application July 21, 1953,
Serial No. 369,508

Claims priority, application Great Britain August 14, 1952

6 Claims. (Cl. 260—31.2)

This invention relates to compositions comprising polyacrylonitrile or a copolymer containing acrylonitrile as the preponderating constituent, and to the production from these polymers of shaped articles such as fibres and films.

A class of polymer of increasing importance consists of polyacrylonitrile and copolymers of acrylonitrile with other unsaturated compounds, especially vinyl compounds. Examples of such other unsaturated compounds are substituted acrylonitriles, e. g. methacrylonitrile; vinyl esters, e. g. vinyl chloride and vinyl acetate; acrylic acid derivatives, e. g. methyl acrylate and phenyl acrylate; styrene and its derivatives; vinyl compounds containing basic nitrogen, e. g. 2-vinyl-pyridine, 2-methyl-5-vinyl-pyridine, and beta-morpholino-ethyl vinyl ether; and vinylidene chloride.

Polyacrylonitrile and acrylonitrile copolymers of good colour and generally suitable for use in making fibres and films can be made for example by polymerising acrylonitrile, or a mixture of acrylontirile with another unsaturated compound as co-monomer, in aqueous emulsion using as catalyst about 0.01% or more of ammonium persulphate and about 0.01% or more of sulphur dioxide, both reckoned on the total weight of monomer. Polyacrylonitrile itself and such copolymers of acrylonitrile with other unsaturated compounds as contain a preponderating proportion of acrylonitrile are in the present specification referred to as acrylonitrile polymers. It is well known that acrylonitrile polymers, especially such as have fibre-forming properties, are in many cases insoluble in the organic liquids commonly employed as solvents, and that this constitutes a considerable difficulty in the way of utilising these polymers.

We have now found that acyloxy aliphatic nitriles containing up to 5 carbon atoms in the molecule, for example formyloxy-acetonitrile, acetoxy-acetonitrile, β-formyloxy-propionitrile and β-acetoxy-propionitrile, are capable of dissolving or swelling polyacrylonitrile and other acrylonitrile polymers. In particular we have found that formyloxy-acetonitrile is a very good solvent, and β-formyloxy-propionitrile a very strong swelling agent, even for polyacrylonitrile itself, and also that solutions of the polymers in formyloxy-acetonitrile are very suitable for use in the manufacture by wet-spinning or wet-casting methods of one- and two-dimensional shaped articles, such as fibres and films, having a basis of an acrylonitrile polymer. The acyloxy nitriles may be substantially pure or in admixture with other liquids as more fully described below.

For the sake of brevity the invention will be more particularly described by reference to the production and use of formyloxy-acetonitrile solutions of fibre-forming polyacrylonitrile. It will however be understood that the invention includes the production and use of solutions of other acrylonitrile polymers, especially such fibre-forming copolymers of acrylonitrile and other unsaturated compounds as are insoluble in acetone. Examples of such copolymers are copolymers containing 85% or more of acrylonitrile and 15% or less of vinyl chloride, 60% or more of acrylonitrile and 40% or less of methacrylonitrile, or 90% or more of acrylonitrile and 10% or less of 2-methyl-5-vinyl-pyridine or morpholinoethyl vinyl ether.

The polyacrylonitrile may be dissolved in the formyloxy-acetonitrile by stirring and heating them together to a temperature above 120° C. and preferably about 125° C. or higher, for example about 125°–150° C. The solutions, once formed, can be kept at temperatures down to about 95° C., or for a short time at lower temperatures, without gelling.

In one preferred embodiment of the invention the polyacrylonitrile is dissolved in substantially undiluted formyloxy-acetonitrile, though the formyloxy-acetonitrile may be diluted to some extent with a compound which is without solvent or swelling action on polyacrylonitrile, e. g. water, methanol or ethanol, preferably in amount less than about 8% of its weight. On the other hand the formyloxy-acetonitrile may be used in association with another solvent for polyacrylonitrile, which should of course be chemically inert for practical purposes towards the formyloxy-acetonitrile under the conditions employed. Examples of such other solvents are dimethyl formamide, sulpholane, lactones such as butyrolactone and the valerolactones, maleic acid and anhydride, succinic and glutaric anhydrides, nitromethane, dihydric phenols such as resorcinol and catechol, cyclic ethylene glycol carbonate and other cyclic carbonates of glycols, ethylene cyanhydrin, nitroethanol, and m- and p-nitrophenol. These additional compounds may be present in relatively small amounts; thus they preferably make up not more than 20%, and especially not more than 12%, by weight of the solvent mixture.

When the solutions of acrylonitrile polymers in formyloxy-acetonitrile are to be used for the production of one- or two-dimensional shaped articles such as fibres or films by extrusion or casting methods, it is preferable that the viscosity of the polyacrylonitrile or other acrylonitrile polymer (measured in 1% solution in dimethyl formamide at 20° C.) should be between about 2.5 and 4 centistokes, and espectially between about 3 and 3.5 centistokes. The concentration of the solution is preferably between about 5% and 25%, and especially 7.5–20%, concentrations of about 10%–15% or 20% being particularly useful.

Shaped articles such as fibres and films are preferably made from the solutions of the invention by a wet-spinning or wet-casting method, i. e. a method in which the solution is extruded or cast into a coagulating liquid miscible with the solvent but incapable of dissolving the polymer. Particularly good results are obtained by using as the coagulating liquid a carboxylic acid ester of boiling point above 250° C., especially a dialkyl phthalate, as described in U. S. patent application Ser. No. 257,198 filed November 19, 1951. Other coagulating liquids may however be used if desired, including aromatic hydrocarbons as described in U. S. patent application Ser. No. 246,718 filed September 14, 1951. The spinning solution, and preferably also the coagulating liquid, should be at a temperature above 95° C. and especially between about 95° and 120° C. or higher.

Fibres made in accordance with the invention are preferably orientated by stretching in order to increase their tenacity. A certain degree of stretch may be imparted to the fibres in the course of the spinning operation, but whether this is done or not, the fibres are preferably stretched by several times, e. g. by 5–15 times, their length in a subsequent operation. For example wet-spun fibres, after leaving the coagulating bath, may be wound up and washed, e. g. in the form of multi-filament yarns, and then stretched while heated; for example they may be stretched in hot air, wet steam or water at a temperature above 80° C. as described in British Patent No. 636,476—or while they are passed in contact with a hot metal surface, e. g. the surface of a plate or roller kept at about 150°–220° C. To obtain a yarn of the highest tenacity it is advantageous to stretch the fibres as soon as possible after coagulation is complete; for example they may be stretched continuously with their formation, if desired after an intermediate wash, e. g. with ether or a hydrocarbon such as benzene. If the separate filaments in a multi-filament yarn show any tendency to stick together or coalesce during the stretching operation, this can generally be prevented by passing the yarn through an aqueous oil emulsion or otherwise applying an aqueous oil emulsion to the yarn before it is heated and stretched, or by carrying out the stretching operation in an aqueous oil emulsion at an elevated temperature, especially at a temperature above 80° C., as described in British Patent No. 636,476. After being stretched the fibres may be treated to increase their extensibility by heating them, e. g. to about 140°–200° C., in the absence of tension until no more shrinkage takes place.

Films and like two-dimensional articles made in accordance with the invention may also be stretched to increase their tenacity.

The invention is illustrated by the following example.

*Example*

10 parts by weight of a polyacrylonitrile of viscosity (in 1% solution in dimethylformamide at 20° C.) 3.3 centistokes was added to 90 parts by weight of formyloxy-acetonitrile, and the mixture heated to 130° C. and stirred until a clear solution had been formed. This solution was extruded at a temperature of 100° C. through a multi-hole spinning jet into a bath of dibutyl phthalate at the same temperature. The yarn formed, while still wet with dibutyl phthalate, was stretched while passing in contact with a metal plate heated to 200° C. The stretched yarn was heated to 180° C. while free to shrink, and was then washed free from dibutyl phthalate with acetone. It had good tenacity and extensibility.

A similar product could be obtained using as solvent a mixture of 92% (by weight) of formyloxy-acetonitrile and 8% (by weight) of dimethylformamide or cyclic ethylene glycol carbonate.

While the solutions of the invention are of particular value in the production of fibres and films and other one- and two-dimensional shaped articles by extrusion or casting methods, they may also be employed for other purposes, e. g. for the production of coatings from the acrylonitrile polymers.

Having described our invention, what we desire to secure by Letters Patent is:

1. Compositions comprising an acrylonitrile polymer and an acyloxy alkyl mononitrile containing up to 5 carbon atoms in the molecule.
2. Compositions comprising an acrylonitrile polymer dissolved in a solvent comprising formyloxy-acetonitrile.
3. Compositions according to claim 2, wherein the polymer is fibre-forming and is dissolved in substantially pure formyloxy-acetonitrile.
4. Compositions according to claim 2, wherein the polymer is fibre-forming and is dissolved in a solvent mixture of a major proportion of formyloxy-acetonitrile and a minor proportion of another compound which itself is a solvent for polyacrylonitrile.
5. Compositions according to claim 4, wherein the solvent mixture comprises 80% or more by weight of formyloxy-acetonitrile.
6. Compositions according to claim 2, wherein the viscosity of the polymer (measured in 1% solution in dimethylformamide at 20° C.) is 2.5–4 centistokes, and its concentration in the solution is 5–25%.

References Cited in the file of this patent

UNITED STATES PATENTS

| | | |
|---|---|---|
| 2,404,724 | Houtz | July 23, 1946 |
| 2,515,206 | Finzel | July 18, 1950 |
| 2,552,814 | Ralston | May 15, 1951 |
| 2,591,670 | Caldwell | Apr. 8, 1952 |